United States Patent [19]

Burrus

[11] 3,965,482
[45] June 22, 1976

[54] VELOCITY CORRECTION CIRCUIT FOR VIDEO DISCS
[75] Inventor: Thomas William Burrus, Indianapolis, Ind.
[73] Assignee: RCA Corporation, New York, N.Y.
[22] Filed: Nov. 12, 1974
[21] Appl. No.: 522,816

[52] U.S. Cl. .................................. 358/8; 178/6.6 P
[51] Int. Cl.² ...................... H04N 5/76; H04N 5/80
[58] Field of Search ............... 358/8, 4; 360/36, 70; 178/6.67 C, 6.6 DD, 6.6 P; 179/100.4 E, 100.4 D

[56] References Cited
UNITED STATES PATENTS
3,711,641  1/1973  Palmer ................................. 360/36
3,871,020  3/1975  Wilber .................................. 358/8

FOREIGN PATENTS OR APPLICATIONS
293,608  9/1965  Australia .............................. 358/4

Primary Examiner—Robert L. Griffin
Assistant Examiner—R. John Godfrey
Attorney, Agent, or Firm—Eugene M. Whitacre; Stephen Siegel; William H. Meagher

[57] ABSTRACT

Velocity and phase errors in signals derived from a rotating video disc are minimized with the use of a voltage controlled oscillator and an electromechanical transducer. A control circuit employing an active and a passive filter maintains an appropriate frequency response to the voltage controlled oscillator and electromechanical transducer in order to appropriately share a single controlling error signal.

5 Claims, 7 Drawing Figures

VELOCITY CORRECTION CIRCUIT FOR VIDEO DISCS

This application is concerned with a video disc player apparatus and more particularly, to circuitry utilized to correct the relative velocity errors in information retrieved from a rotating video disc.

In one type of video disc reproducing system, capacitance variations measured between a signal pickup stylus and video disc record is sensed to reconstruct the information embossed within a spiral groove on the record. In this type of video disc system, the video information is recorded in the form of geometric variations in the spiral groove on the surface of the record. The disc surface may include a conductive material covered with a thin coating of dielectric material. A metal electrode associated with the stylus playback device cooperates with the conductive material and dielectric coating to form a capacitor. Capacitance variations due to the signal representative geometrical variations in the spiral groove are sensed and decoded to provide a video representative output signal. A detailed description of a capacitive video disc system is described in U.S. Pat. No. 3,842,194, in the name of Jon K. Clemens and entitled, "INFORMATION RECORDS AND RECORDING PLAYBACK SYSTEMS THEREFOR."

In order to accurately reconstruct the information received from the video disc into a relatively jitter-free color image, it is desirable to compensate for all velocity and phase errors in the derived video information. Composite video signals that are derived from the rotating video disc may be subject to velocity errors that are due, for example, to disc warpage or eccentricity of the information storing spiral groove with respect to the center hole in the disc. As a result of this disc warpage or eccentricity, a signal sensed by an associated signal pickup stylus may be received at alternately faster and slower speeds than that at which it was recorded. One scheme that may be utilized to compensate for velocity errors incorporates an electromechanical device for repositioning the signal pickup stylus in response to velocity errors. An electromechanical device of this type, referred to as an arm stretcher, may include a transducer that is mechanically coupled to the signal pickup stylus. Upon application of appropriate electrical signals to this transducer, the pickup stylus is caused to traverse along the spiral groove of the disc for effecting a decrease in the velocity errors. A typical arm stretcher is described in U.S. Pat. No. 3,711,641, in the name of Richard C. Palmer, assigned to RCA Corporation.

In previous video disc player systems, the arm stretcher apparatus was controlled by timing signals such as vertical or horizontal sync pulses. The use of sync pulse signals, however, requires relatively elaborate circuitry for decoding these pulse signals with a minimum amount of noise interference and with relatively stable leading edges. The presence of noise signals or unstable edges on the timing signals may undesirably produce erroneous control signals to the arm stretcher resulting in a severe degrading of the displayed image.

Further, the arm stretcher transducer is generally capacitively coupled to the driving circuitry in order to eliminate high transducer currents at extremely low frequencies. The use of capacitive coupling, however, undesirably contributes phase shift to the arm stretcher control circuitry limiting the resultant transducer frequency response.

An improved arm stretcher control circuit having direct current coupling and utilizing the color subcarrier burst signal recorded on the video disc for providing velocity reference signals includes a means coupled to a signal pickup stylus for deriving video signals from information recorded on the video disc. Heterodyning means are coupled to the signal deriving means for frequency translating the derived video signal. A portion of the frequency translated video signal is compared within a phase comparator to a signal provided by a reference oscillator. A resultant difference signal provided by the phase comparator is utilized to control the heterodyning frequency of the heterodyning means. A first filter means also receives difference signals from the phase comparator and provides the low frequency portion of these signals at a relatively high gain to the electrical signal input of the arm stretcher transducer. Signals provided at the output of the first filter means are further coupled to a second filter means. The second filter means is also coupled to the heterodyning means and effects an increase in the amount of difference signal thereto at frequencies other than that of the rotational velocity of the video disc record.

A better understanding of the invention may be derived from the accompanying specification when taken with the following drawings of which:

Figure 1:
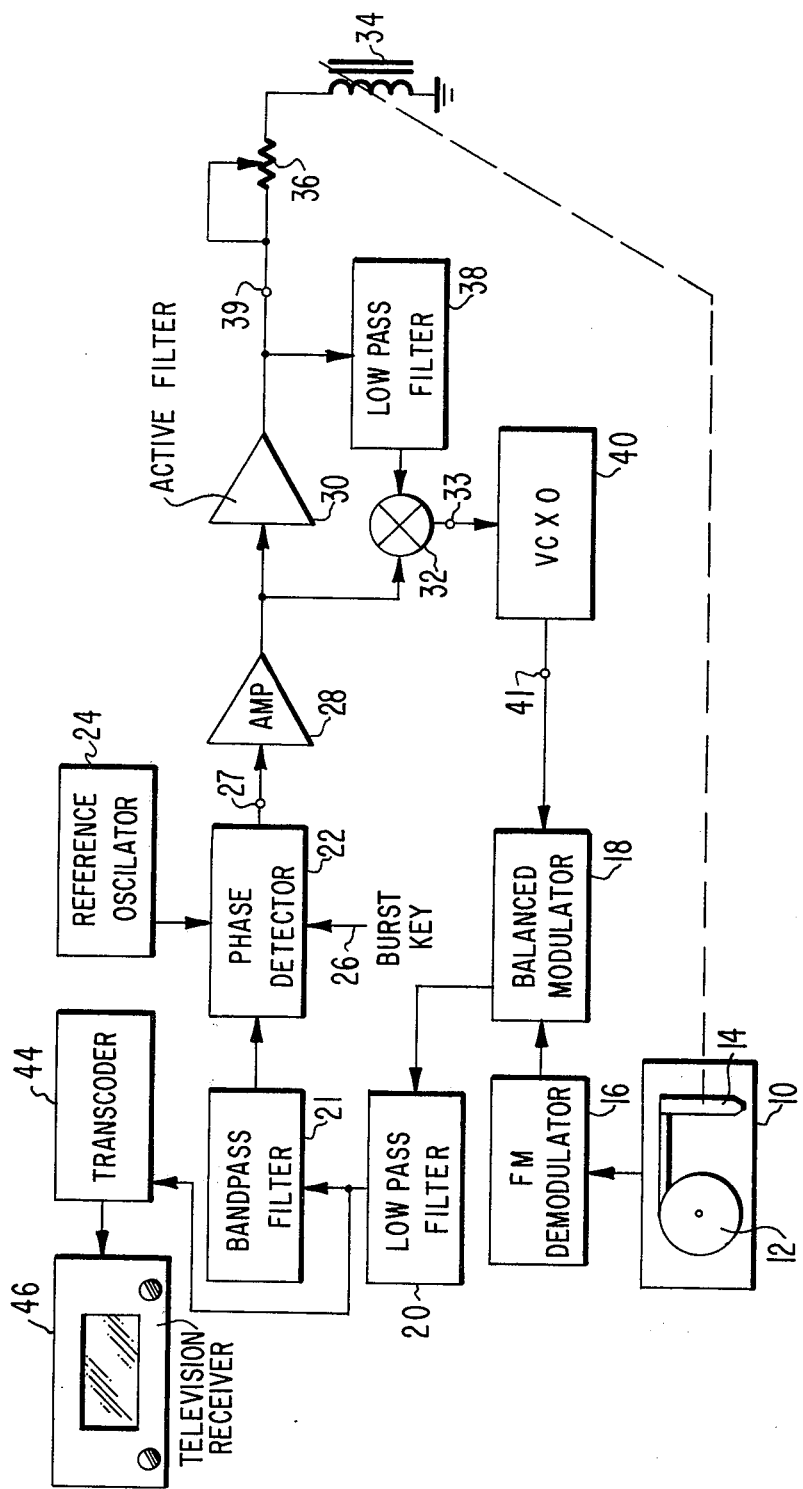
FIG. 1 is a block diagram of an arm stretcher transducer control circuit in accordance with the present invention.

With reference to FIG. 1, a video disc player 10 has a video disc 12 located thereon. A signal pickup arm 14 located on player 10 has a signal pickup stylus located therein but not shown in the drawing. Signals derived from pickup arm 14 are coupled to an FM demodulator 16. Demodulator 16 provides signals to a balanced modulator 18. Modulator 18 has an output terminal coupled to a low-pass filter 20 which couples signals therefrom to a bandpass filter 21 and a transcoder 44. Signals provided to transcoder 44 are coupled to a receiver 46 while those supplied to filter 21 are coupled to a phase detector 22. Phase detector 22 further receives signals from a reference oscillator 24 and from a burst key input line 26. Signals provided by phase detector 22 are coupled through a buffer amplifier 28 to an active filter 30 and a summing network 32. Filter 30 modifies the applied signals and couples the modified signals to an arm stretcher transducer 34 through a variable resistor 36. Transducer 34 is mechanically coupled to the signal pickup stylus in signal pickup arm 14 and provides mechanical motion to this stylus. A low-pass filter 38 also receives signals from filter 30 and couples these signals to the aforementioned summing junction 32. Signals summed at junction 32 are coupled to a voltage controlled crystal oscillator 40 which in turn provides signals to the balanced modulator 18.

In the operation of the above-described circuitry, the video disc 12 is rotated on a turntable associated with player 10. For purposes of illustration, it may be assumed that the center hole of the disc is not centered with respect to the associated information storing spiral groove. Hence, signal information derived from the disc will be subject to changes in velocity as the disc rotates. A signal pickup stylus located within signal pickup arm 14 senses the capacitance variations associated with the recorded topography in the spiral groove of the disc and couples this capacitive variation to circuitry, not shown, within arm 14. The circuitry within arm 14 converts the capacitive variations into electrical signals which are then coupled to an FM demodulator 16. A detailed description of circuitry suitable for converting capacitance variations into electrical signals is given in a copending U.S. Patent Application in the name of D. J. Carlson, et al, Ser. No. 451,103, now issued as U.S. Pat. No. 3,872,240.

Demodulator 16 decodes the FM signals provided from arm 14 into signals representative of the recorded video signal information. Signals on the video disc are generally recorded in a buried subcarrier format. A buried subcarrier signal illustratively includes a broad band luminance signal component of about 3 MHz bandwidth and an interleaved narrow band chrominance signal component. The chrominance signal component may be in the form of ½ MHz sidebands of a 1.53 MHz subcarrier substantially located in the midband of the broad band luminance component. A chrominance reference burst signal may further be included during the back porch interval of the horizontal sync pulse signals in a similar manner to the reference burst signal component of NTSC type of video signals.

Figure 3:
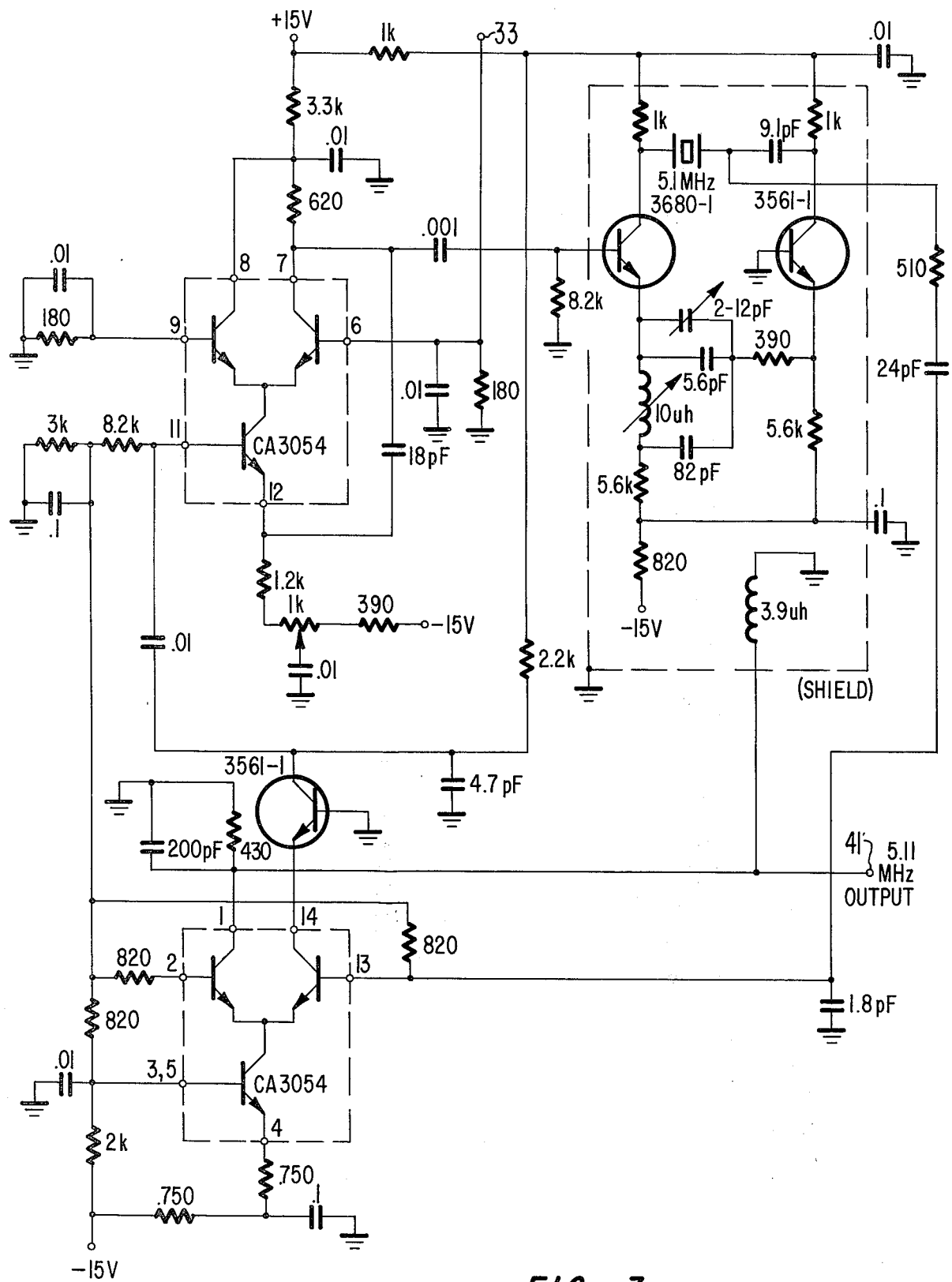
FIG. 3 is a schematic drawing of a voltage controlled oscillator suitable for use with the apparatus shown in FIG. 1.

Signals provided by demodulator 16 are coupled to balanced modulator 18. Modulator 18 may be of a singly balanced type for which the video signal input portion is balanced. By utilizing a modulator with a balanced input, the baseband video modulating component may be substantially eliminated from the modulator output signal. Elimination of the baseband signal at the output of the modulator is desirable for providing simplified filtering for the recovery of substantially only the first frequency translated video signal. The video signals applied to modulator 18 are translated in frequency by signals provided by a voltage controlled crystal oscillator (VCXO) 40. Oscillator 40 provides signals that are substantially at 5.11 MHz. Upon heterodyning the signals from oscillator 40 with the video signals provided by demodulator 16, frequency translated video signals are produced having upper and lower sideband components on each side of the 5.11 MHz oscillator frequency. A voltage controlled crystal oscillator suitable for use with the above-described apparatus is illustrated in FIG. 3.

A low-pass filter 20, having a bandpass of about 8 MHz, passes substantially only the first modulation product produced by modulator 18. Signals provided by filter 20 have chrominance reference burst components that have been translated from 1.53 MHz in the baseband signal to 3.58 MHz and 6.64 MHz in the frequency translated signals. A bandpass filter 21 receives signals from filter 20 and passes signals in the region of 3.58 MHz allowing the chrominance reference burst signals in the lower sideband of the translated video signal to pass therethrough. Chrominance reference burst signals provided at the output of filter 21 are phase compared in detector 22 with a 3.58 MHz reference signal provided by a relatively stable frequency source 24. Reference source 24 is preferably a crystal controlled oscillator.

Burst key signals are coupled to terminal 26 of detector 22 for inhibiting phase comparison in the interval between burst signals. The burst key signals are produced by circuitry, not shown, in response to horizontal synchronization signals which have been decoded from the video disc information.

A resultant difference signal provided at the output of the phase detector 22 is coupled through a terminal 27 to a buffer amplifier 28. Amplifier 28 receives the phase difference signals from detector 22 and couples these signals at a relatively low impedance to an active filter 30 and a summing circuit 32.

The resultant difference signals provided at the output of detector 22 may be utilized for stabilizing the entire video signal with the aforementioned arm stretcher and stabilizing the chrominance reference burst signal with an appropriate feedback loop. Stabilization of the chrominance reference burst signal is desirable for effecting color decoding by a television receiver. Stabilization of the entire video signal is desirable for minimizing undesired effects in the displayed image caused by the aforementioned disc warp and eccentricity. It is desirable to provide both types of stabilization. It will be appreciated that stabilization of either the chrominance reference burst signal or the entire video signal will, as correction occurs, operate to minimize the amplitude of the difference signals provided by detector 22. Therefore, gain adjustment of the difference signals to each stabilizing circuit is of particular importance. The problem of providing a desired amount of signal gain to each of the stabilizing circuits is substantially eliminated by utilizing filters 30 and 38.

Stabilization of the chrominance subcarrier frequency is accomplished by shifting the frequency of VCXO 40 in consonance with the difference signal provided by detector 22. By varying the frequency of VCXO 40, the heterodyning frequency of modulator 18 is caused to vary. Frequency translated signals provided at the output of modulator 18 are therefore frequency shifted in a direction which minimizes the difference signals.

Stabilization of the entire video signal is accomplished by supplying phase difference signals to arm stretcher transducer 34. Arm stretcher 34 may be formed in a similar manner to a relatively small loudspeaker. For example, the cone of the loudspeaker may be mechanically coupled to the signal pickup stylus and the electromagnetic field of the speaker coupled to a source of phase difference signals. Application of phase difference signals to the arm stretcher causes the signal pickup stylus to traverse along the spiral groove of the record and minimize the phase difference signals.

If the playback speed of the turntable on player 10 is operated at about 450 rpm, then the velocity change in received signal information recurs at about 7.5 times per second. Because of the information velocity change with each disc revolution, filters 30 and 38 are adjusted to provide a greater amount of difference signal passage to arm stretcher 34 at 7.5 Hz than to the VCXO 40. A detailed description of filters 30 and 38 is given with reference to FIG. 2. By utilizing the arm stretcher to provide correction at relatively low frequencies, e.g., 7.5 Hz, gross velocity errors in the derived video information may be minimized.

Signals that have been stabilized by both arm stretcher 34 and VCXO 40 appear at the output of filter 20. A transcoding device described in detail in a copending U.S. Patent Application in the name of John Amery, entitled, "COMB FILTERING FOR VIDEO PROCESSING," Ser. No. 506,446, receives stabilized signals from filter 20 and rearranges these signals into a format that is easily decoded by an unmodified television receiver such as receiver 46.

Figure 2:
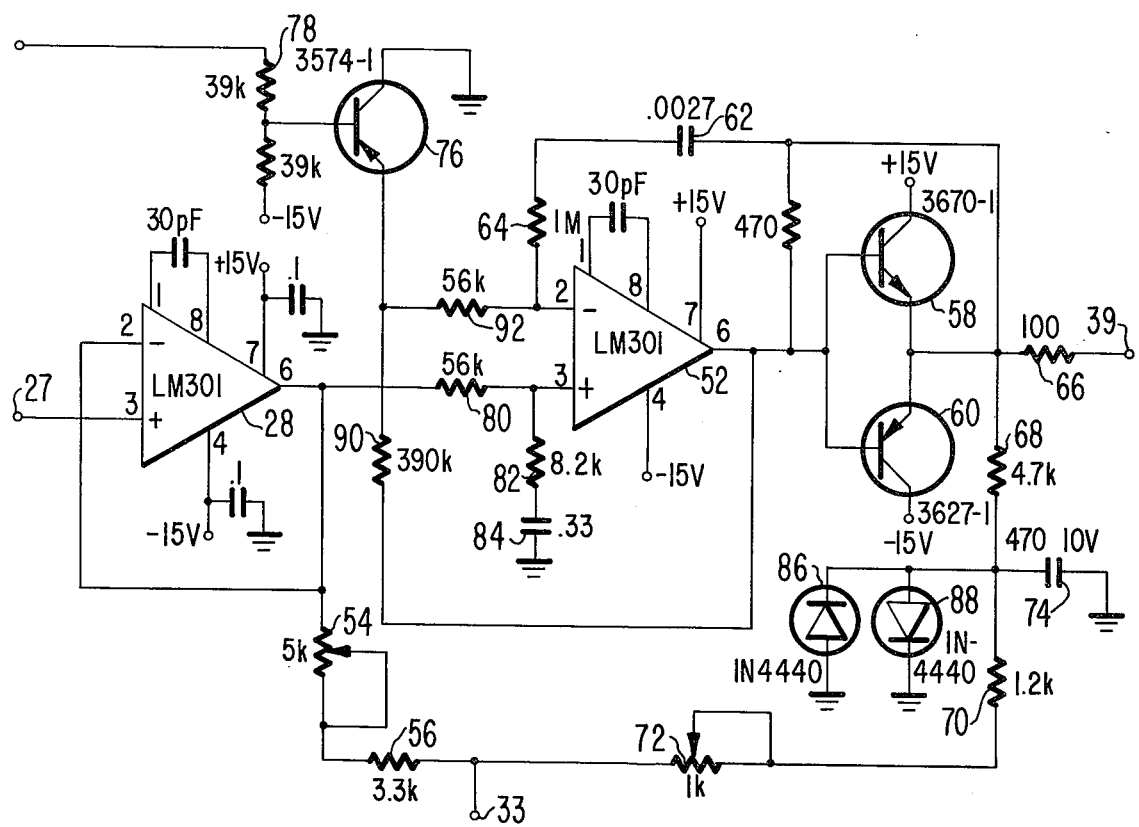
FIG. 2 is a schematic diagram of control circuitry utilized to drive an arm stretcher transducer in accordance with the present invention.

With reference to FIG. 2, an input terminal of buffer amplifier 28 is coupled to terminal 27 for receiving signals provided by phase detector 22. Signals provided by amplifier 28 are coupled through a resistor 80 to a non-inverting input of amplifier 52. A series combination of resistor 82 and capacitor 84 is further coupled to the non-inverting input of amplifier 52. Signals provided at the output of amplifier 52 are coupled to an inverting input terminal through resistors 90 and 92 and to the base electrodes of a driver amplifier formed by transistors 58 and 60. Transistors 58 and 60 have commonly coupled emitter electrodes and provide signals therefrom to an inverting input terminal of amplifier 52 through the series combination of capacitor 62 and resistor 64. Signals provided at the emitters of transistors 58 and 60 are further coupled to a terminal 39 through a resistor 66 and to a summing terminal 33 through a low-pass filter formed by the series combination of resistors 68, 70 and 72 and shunt capacitor 74. Signal limiting diodes 86 and 88 are coupled across capacitor 74. Summing terminal 33 further receives signals from the output of amplifier 28 through series coupled resistors 54 and 56.

A squelch circuit, utilized when signal information is not being derived from video disc 12, comprises a transistor 76 having an emitter electrode coupled to the junction of resistors 90 and 92. Control signals to operate this squelch circuit are provided to the base electrode of transistor 76 through a resistor 78.

In the operation of the circuit described in FIG. 2, phase difference signals (error signals) provided by the phase detector 22 (see FIG. 1) are coupled through temrinal 27 to amplifier 28. Amplifier 28 is arranged to provide unity gain by having an output terminal coupled to an inverting input terminal. The signals provided at the output of amplifier 28 are coupled to amplifier 52. Amplifier 52 is arranged as an active filter for providing appropriate signals to both the arm stretcher and voltage controlled oscillator. Signals provided by buffer amplifier 28 are coupled through summing resistors 54 and 56 to a terminal 33 and also to a non-inverting input terminal of amplifier 52. The signals provided to terminal 33 form one path of the phase difference signals utilized to control VCXO 40. Amplifier 52 incorporates two RC time circuits for forming appropriate break points in its frequency response. The first RC time constant is formed by resistors 80, 82 and capacitor 84. This RC timing network forms break points in the amplifier response at about 7.5 Hz and 59 Hz. A second RC timing network is formed by resistor 64 and capacitor 62. This second timing network forms break points at about 0 Hz and 59 Hz. The two break points formed at 59 Hz are in consonance with break points in the frequency response of transducer 34. A curve illustrating the frequency response from terminal 27 to the output of transducer 34 is shown in FIG. 4a.

Transistors 58 and 60 are arranged in emitter follower configuration and utilized for providing current amplification to the signals provided by amplifier 52. Signals provided by transistors 58 and 60 are coupled through a resistor 66 and terminal 39 to the arm stretcher transducer. Since the electrical portion of the arm stretcher transducer is of a relatively low impedance, it is desirable to provide controlling circuitry which will supply a relatively low current to the arm stretcher transducer for frequencies near 0 Hz. To enable a low transducer current at near d.c. frequencies, VCXO 40 is arranged to receive a relatively large amount of difference signals in the vicinity of 0 Hz. By providing a large amount of signal gain to VCXO 40 at the extremely low frequencies, error signals provided by detector 22 are minimized keeping the control signal current to arm stretcher 34 at a minimum.

The relatively low impedance signals at the emitters of transistors 58 and 60 are further coupled to a low-pass filter formed by resistors 68, 70 and 72 and capacitor 74. This latter low-pass filter has a 3 db point at about 0.27 Hz which provides, when taken with the frequency response of amplifier 52, a frequency response curve substantially as shown in FIG. 4b. Signals provided from this latter low-pass filter are coupled to terminal 33 and add to those signals supplied to terminal 33 directly from amplifier 28. Combined signals formed at terminal 33 have a frequency response substantially as shown in FIG. 4c. A pair of diodes 86 and 88 are incorporated in the low-pass filter for preventing inadvertent large signal excursions caused, for example, by noise impulses.

Figure 4A:
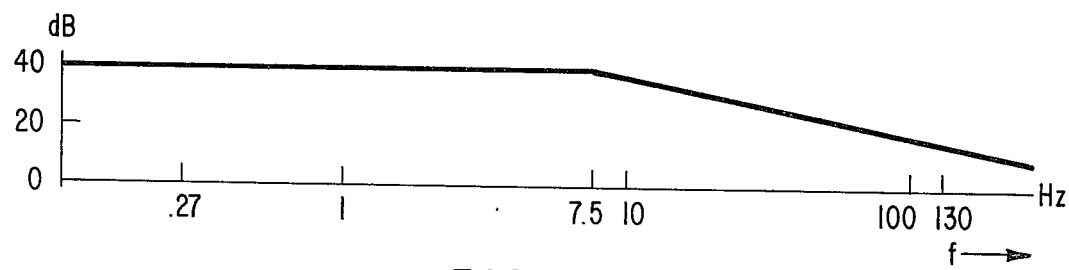
FIGS. 4a–4d are frequency response curves of the apparatus shown in FIGS. 1 and 2.
Figure 4B:
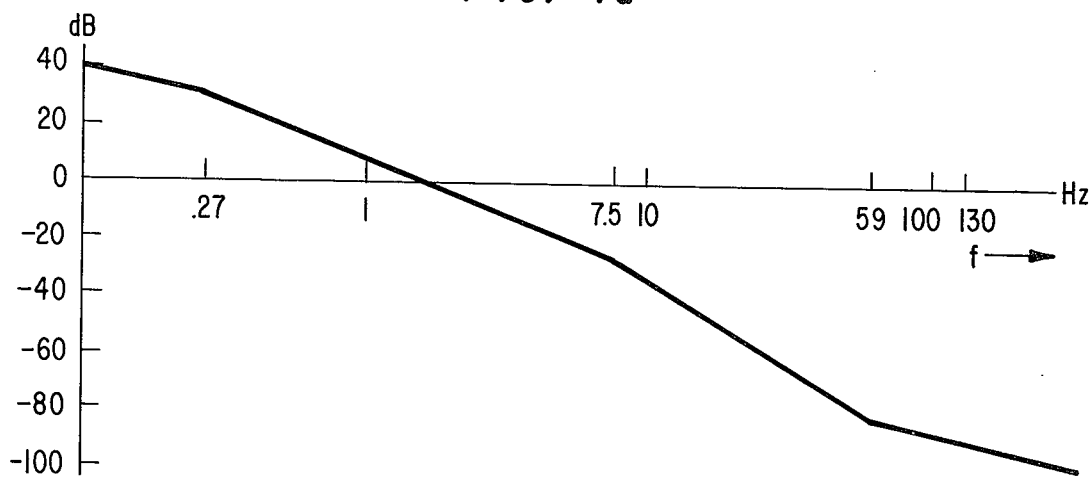
Figure 4C:
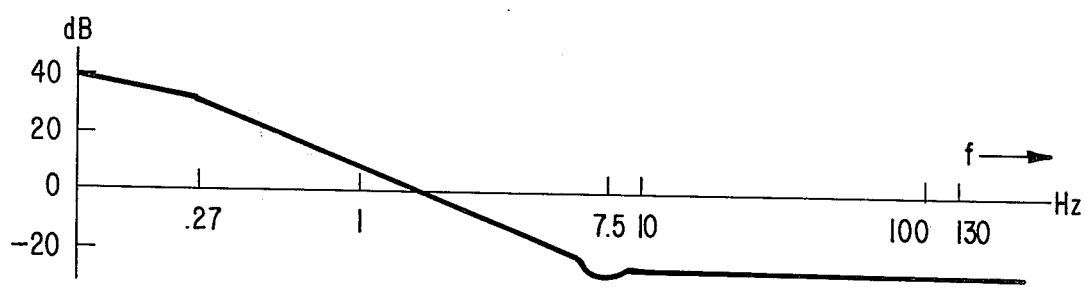
Figure 4D:
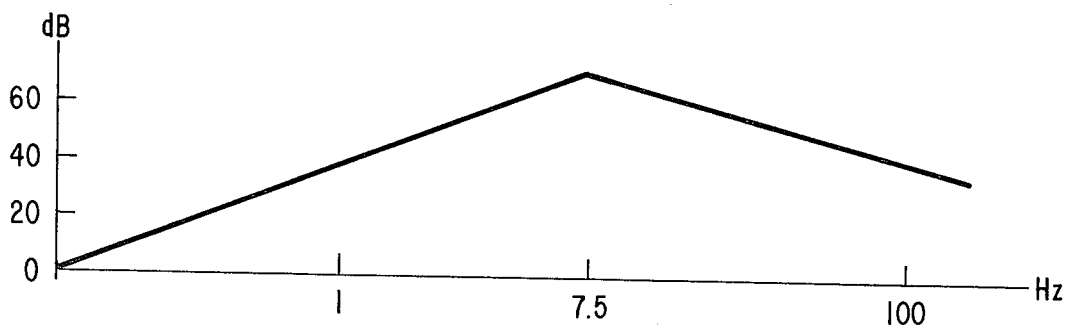

By comparing the response of the active filter and transducer 34, as shown in FIG. 4a, with the frequency response provided to VCXO 40 (terminal 33), as shown in FIG. 4c, a resultant curve, shown in FIG. 4d, may be produced which illustrates the difference in gain between the arm stretcher and voltage controlled crystal oscillator. With reference to FIG. 4d, it can be seen that the amplitude response of arm stretcher transducer 34, as compared to the response associated with VCXO 40, is at a maximum at about 7.5 Hz. This gain maximum allows the arm stretcher to provide a desired amount of correction for velocity errors caused by eccentricity and warpage of the video disc. It will be appreciated that the frequency range over which the arm stretcher transducer receives increased amplitude error signals is relatively narrow. By keeping this frequency range narrow, velocity error correction by arm stretcher 34 may be effectively accomplished without adversely affecting the phase error correction of the reference burst by VCXO 40.

A squelch transistor 76 is further incorporated with the amplifier 52. This transistor operates in the saturation mode during the period of time when signal information is extracted from the video disc. In the absence of signals from the video disc as, for example, when a video disc is not being played, a control signal is applied through resistor 78 to the base of transistor 76 causing this transistor to turn off. When transistor 76 is off, signals provided at the output of amplifier 52 are coupled through resistors 90 and 92 to the inverting input terminal of this amplifier causing the gain of amplifier 52 to change to substantially unity gain.

The above-described circuitry illustrates that a relatively low impedance arm stretcher transducer may be direct current coupled to appropriate drive circuitry without being subject to high input currents at extremely low frequencies. Further, by adjusting the appropriate time constants associated with filter 38 and the active filter incorporating amplifier 52, the amount of transducer output may be increased at a frequency corresponding to the rotational velocity of the video disc allowing the arm stretcher to effectively minimize signal velocity errors due to disc eccentricity and warpage.

What is claimed is:

1. In a video disc player in which a signal pickup stylus cooperates with a signal information storing groove of a disc subject to rotation at a given rotational frequency, said information storing groove including recorded luminance, chrominance and color synchronization signal components, and said signal components as recovered by said pickup stylus being subject to frequency errors as a consequence of errors in the velocity of relative motion between said disc groove and said pickup stylus, apparatus for providing correction of said signal component errors comprising:

means coupled to said signal pickup stylus for providing video signals from information recorded on said video disc;

a voltage controlled oscillator providing oscillations of controllable frequency;

heterodyning means responsive to said video signals and said oscillations for frequency translating said video signals;

a reference oscillator;

phase detecting means responsive to a frequency translated color synchronization component derived from said heterodyning means and to an output of said reference oscillator for providing error signals;

means for supplying said error signals to said voltage controlled oscillator to provide, over a range of error signal frequencies, an adjustment of the frequency of said oscillations in a sense opposing departures from frequency correspondence between said reference oscillator output and said frequency translated color synchronization component;

a transducer coupled to said signal pickup stylus for repositioning said stylus along said video disc groove in response to electrical signals;

means for rendering said transducer responsive to error signals from said phase detecting means in a sense opposing said errors in velocity of relative motion;

said last-named means including an error signal amplifier having a input and an output, means providing a direct current coupling for error signal information between said phase detecting means and said error signal amplifier input, additional means providing a direct current coupling for error signal information between said error signal amplifier output and said transducer, and frequency selective means coupled to said error signal amplifier for shaping the frequency response characteristic thereof in a manner effectively restricting the the velocity error opposition provided by said transducer to a relatively narrow low frequency portion of said error signal frequency range, said portion encompassing error signal frequencies inclusive of said rotational frequency; and means coupled between the output of said error signal amplifier and said voltage controlled oscillator for augmenting the error signal applied thereto by said first-named error signal supplying means, said error signal augmenting means having a frequency response characteristic effectively confining said augmentation to a narrow segment of said low frequency range portion below said rotational frequency.

2. Apparatus according to claim 1 wherein: said frequency response characteristic of said error signal amplifier has a break point at a frequency corresponding to said rotational frequency.

3. Apparatus according to claim 2 wherein:

said frequency response characteristic of said error signal augmenting means has a break point at less than one hertz.

4. In a video disc player in which a signal pickup stylus cooperates with a signal information storing groove of a disc subject to rotation at a given rotational frequency to recover recorded composite video signals including luminance, chrominance and color synchronization signal components, and wherein said recovered signal components are undesirably subject to frequency errors as a consequence of deviations from a desired velocity of relative motion between said disc groove and said pickup stylus, correction apparatus comprising:

means coupled to said stylus for developing composite video signals representative of information stored in said video disc groove;

a voltage controlled oscillator providing oscillations of a controllable frequency;

heterodyning means responsive to said oscillations and said developed signals for frequency translating said developed signals;

a reference oscillator;

an arm stretcher transducer coupled to said stylus for imparting motion to said stylus along said groove in response to signals applied thereto;

means for phase comparing signals from said reference oscillator with a color synchronization component of said frequency translated signals to develop error signals indicative of departures from frequency correspondence therebetween;

means, having a first frequency response characteristic, for supplying said error signals from said phase comparing means to said voltage controlled oscillator to establish a first component frequency error correction loop; and means, coupled to said phase comparing means and having a second frequency response characteristic, for supplying said error signals to said arm stretcher transducer to establish a second component frequency error correction loop;

said first frequency response characteristic differing from said second frequency response characteristic in such manner that correction of frequency errors which recur at said rotational frequency is predominately effected by said second correction loop to the substantial exclusion of said first correction loop, whereas said first correction loop provides significant correction of errors which recur at frequencies in a narrow range below said rotational frequency.

5. Apparatus according to claim 4 wherein:

said narrow range lies below a frequency of one hertz.

* * * * *